(12) United States Patent  
Cresswell et al.

(10) Patent No.: US 7,267,519 B2
(45) Date of Patent: Sep. 11, 2007

(54) LOADING CONVEYOR WITH FOLDING HOPPER FOR AGRICULTURAL COMMODITY CARTS

(75) Inventors: Mark Cresswell, St. Brieux (CA); Scot Jagow, St. Brieux (CA); Bob Cochran, St. Brieux (CA); Dean Thomas, St. Brieux (CA)

(73) Assignee: Bourgault Industries Ltd., St. Brieus, Saskatchewan (CA)

( * ) Notice: Subject to any disclaimer, the term of this patent is extended or adjusted under 35 U.S.C. 154(b) by 395 days.

(21) Appl. No.: 10/832,024

(22) Filed: Apr. 26, 2004

(65) Prior Publication Data

US 2005/0238469 A1   Oct. 27, 2005

(51) Int. Cl.
   *A01D 90/00*   (2006.01)
(52) U.S. Cl. ............... 414/526; 414/488; 414/502; 198/313; 198/586; 198/668
(58) Field of Classification Search ............... 414/475, 414/486, 488, 502, 507, 526; 198/313, 586, 198/668
   See application file for complete search history.

(56) References Cited

U.S. PATENT DOCUMENTS 4,427,105 A * 1/1984 Hawley et al. ............. 198/632
4,669,945 A * 6/1987 Pollard et al. ............. 414/505
5,538,388 A * 7/1996 Bergkamp et al. .......... 414/523
5,980,189 A * 11/1999 Rubner ...................... 414/505

FOREIGN PATENT DOCUMENTS

CA         2257048        6/2000

* cited by examiner

*Primary Examiner*—David H. Bollinger
*Assistant Examiner*—M. S Lowe

(57) ABSTRACT

An agricultural commodity cart loading conveyor apparatus comprises a conveyor mounted to an agricultural commodity cart. A hopper is pivotally attached to the lower end of the conveyor tube and a hopper conveyor section is mounted along a bottom of the hopper. The hopper pivots from an extended position to a folded position. In the extended position the hopper is oriented at an angle to the conveyor tube such that the hopper extends along the ground when the conveyor is in the operating position, and is connected to the lower end of the conveyor tube such that the hopper conveyor section conveys material entering the hopper into the lower end of the conveyor tube for conveyance up the conveyor tube. A lock is operative to lock the hopper and conveyor together when the hopper is in the extended position. Hydraulic cylinders can be provided to facilitate use with larger conveyors.

10 Claims, 11 Drawing Sheets

LOADING CONVEYOR WITH FOLDING HOPPER FOR AGRICULTURAL COMMODITY CARTS

This invention is in the field of air seeders such as are used in agriculture for seeding, fertilizing, and the like, and in particular with conveyors such as are mounted on agricultural commodity carts of such air seeders to transfer seed, fertilizer, and the like from a transport vehicle to tanks on the cart.

BACKGROUND OF THE INVENTION

Air seeders are known in the agricultural industry for planting and fertilizing crops. A typical air seeder comprises a frame for mounting a plurality of furrow openers and an agricultural commodity cart comprising at least one, and commonly two, three or more tanks for carrying various agricultural products like seed and fertilizer. Although not always present, commonly there is a conveyor mounted on the cart for transferring agricultural products from transport vehicles into the tanks. It is commonly seen as more convenient to mount a conveyor on the cart rather than on each transport vehicle, or maneuver a portable conveyor as a separate implement altogether.

The conveyor is typically mounted on a pivot mechanism configured to allow it to be moved from a transport position, where the bottom end of the conveyor is raised for transport, to an operating position where the bottom end is lowered to receive agricultural material from the transport vehicle, and is typically resting on the ground. The pivot mechanism also allows the conveyor to be maneuvered so that a spout on the upper discharge end of the conveyor can be maneuvered to direct agricultural product from the conveyor into the filling hatch for each tank.

Cart loading conveyors commonly include a hopper at the bottom intake end to receive agricultural product from the transport vehicle. Conventional cart conveyors typically comprise simply a straight tube with an auger inside to convey the product, and the hopper is simply mounted on the lower end. With hopper-bottom trailers such as are increasingly being used to carry agricultural products to air seeders, it is difficult to position a conventional hopper under the discharge chute located in the center of the trailer.

Canadian Patent Application Number 2,257,048 to Lisafeld discloses an agricultural commodity cart having an auger conveyor with an auger extension and hopper that extends horizontally under such a hopper-bottom trailer when the auger conveyor is in an operating position. Thus the hopper can be positioned under the discharge chute of the trailer to receive agricultural product. The length of the conveyor is increased by addition of the auger extension, such that the conveyor extends significantly beyond its original position. In some cases this can make it impractical to use the auger extension since it can interfere with other operations. The added weight of the auger extension further makes it more difficult to maneuver the conveyor manually into a desired position.

It is generally desirable to clean out the hopper on such conveyors when changing from one agricultural product to another in order to minimize contamination of the tanks with different agricultural products. On conventional cart conveyors, it is often possible to simply rotate the hopper on the conveyor tube such that the hopper is oriented downward. The auger can then be rotated in reverse so that material in the tube falls out of the lower end of the tube and into the inverted hopper and onto the ground.

Similarly in the apparatus of Lisafeld, while the hopper cannot be rotated on the auger tube, a cleanout port is provided in the bottom of the hopper so that the auger can be reversed and the majority of material will fall out the cleanout port. Some manual pushing of material is required to completely clean out the hopper.

As agricultural equipment grows larger, it is desired to provide larger conveyors for loading agricultural commodity carts. Such carts are now available that will carry 500 bushels or more of various agricultural products, and so the conventional seven and eight inch diameter auger conveyors take a significant amount of time to transfer a full load of product from the transport vehicle to the tanks. Ten inch auger conveyors would be much faster, however the large size makes it difficult to maneuver such conveyors.

It is desirable that the intake for a conveyor be screened to sieve the agricultural products and prevent entry into the agricultural commodity cart of lumps or foreign objects that could plug the tubes that carry agricultural products. This sieve screen has a mesh size that inhibits the flow of agricultural products through the sieve screen and into the auger intake. When increasing the capacity of the auger conveyor provision must also be made to provide a larger area of sieve screen that will allow the agricultural products to flow into the intake at the required increased rate. With conventionally configured hoppers this can be problematic since the conventional hopper is inclined on all sides. Thus to increase the sieve screen area, the conventional hopper must be made larger in every direction, which can interfere with fit under the discharge chute of a material transporting vehicle and ready storage in the transport position.

SUMMARY OF THE INVENTION

It is an object of the present invention to provide an agricultural commodity cart loading conveyor that overcomes problems in the prior art. It is a further object of the present invention to provide such a conveyor that comprises a conveyor extension within a hopper extending at an angle from the intake end of the conveyor to facilitate receiving agricultural materials from hopper bottom transport vehicles, and facilitate providing a larger sieve screen over the intake to satisfactorily feed a conveyor with increased capacity, and yet is more compact than prior art conveyors. It is a further object of the present invention to provide such a conveyor apparatus that includes a pivoting hopper that can be folded to reduce the length of the apparatus.

The present invention provides, in a first embodiment, an agricultural commodity cart loading conveyor apparatus comprising an agricultural commodity cart comprising at least one tank having a fill hatch located at a top portion of the cart. A conveyor comprising a conveyor tube is mounted to the cart such that the conveyor can be moved from a transport position wherein a lower end of the conveyor tube is raised off the ground, to an operating position wherein a lower end of the conveyor tube is substantially on the ground and the conveyor tube is inclined upward such that an upper discharge end of the conveyor tube is oriented to direct material discharged there-from into a fill hatch. A hopper is pivotally attached to the lower end of the conveyor tube and a hopper conveyor section is mounted along a bottom of the hopper. The hopper can pivot from an extended position to a folded position, and in the extended position the hopper is oriented at an angle to the conveyor tube such that the hopper extends along the ground when the conveyor is in the operating position, and in the extended position the hopper is connected to the lower end of the conveyor tube such that the hopper conveyor section conveys material entering the hopper into the lower end of the conveyor tube for conveyance up the conveyor tube. A lock is operative to lock the hopper and conveyor tube together when the hopper is in the extended position.

The present invention provides, in a second embodiment, an agricultural commodity cart loading conveyor apparatus comprising an agricultural commodity cart comprising at least one tank having a fill hatch located at a top portion of the cart. A conveyor comprising an auger inside a conveyor tube is mounted to the cart such that the conveyor can be moved from a transport position wherein the conveyor tube is raised off the ground, to an operating position wherein a lower end of the conveyor tube is substantially on the ground and the conveyor tube is inclined upward such that an upper discharge end of the conveyor tube is oriented to direct material discharged there-from into a fill hatch. A hopper is pivotally attached to the lower end of the conveyor tube about a hopper pivot axis located above the conveyor and oriented substantially horizontally and perpendicular to the conveyor tube, and an auger extension is rotatably mounted along a bottom of the hopper. A tube transition section extends from a rear end of the hopper at an angle to the auger extension. The hopper can pivot from an extended position wherein the tube transition section is aligned with the conveyor tube and the hopper extends along the ground when the conveyor is in the operating position, to a folded position. An auger section inside the tube transition section is connected at one end to an inner end of the auger extension and adapted at an opposite end to releasably engage a lower end of the auger of the conveyor when the hopper is in the extended position such that rotation of the auger rotates the auger extension and such that the hopper can be pivoted to disengage the auger and auger extension and move the hopper into the folded position. A lock is operative to lock the hopper and conveyor tube together when the hopper is in the extended position.

Conveniently, the apparatus includes hydraulic cylinders to fold and unfold the hopper, and also to raise and lower the conveyor, and to swing the conveyor laterally, thereby facilitating the use of larger diameter conveyors with higher capacity than those common in the prior art. Such a hopper can also be of a sufficient length to provide a sieve screen over the intake that will allow for flow of agricultural products at an increased rate to feed a conveyor with an increased capacity.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
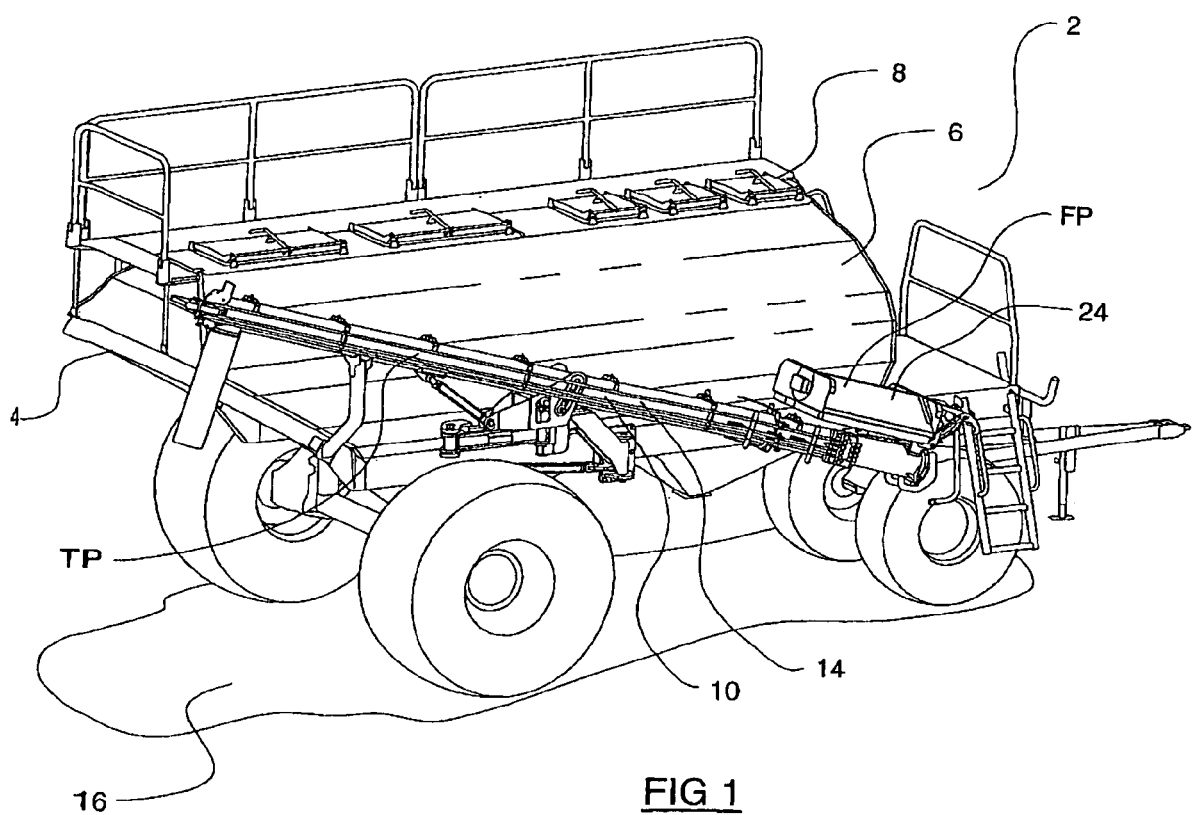
FIG. 1 is a perspective view of an embodiment of the invention with the conveyor in the transport position, and the hopper in the folded position.

FIGS. 1-9 illustrate an agricultural commodity cart loading conveyor apparatus 2 of the invention. The apparatus 2 comprises an agricultural commodity cart 4 comprising a plurality of tanks 6. Each tank 6 has a fill hatch 8 located at a top portion of the cart 4. The cart 4 is typically attached to a seeding tool bar (not illustrated) that is operative to receive the agricultural commodities carried in the tanks 6 through a system of air ducts, and deposit the material in the soil. Such carts are typically pulled either directly behind or sometimes directly ahead of such a tool bar.

Figure 2:
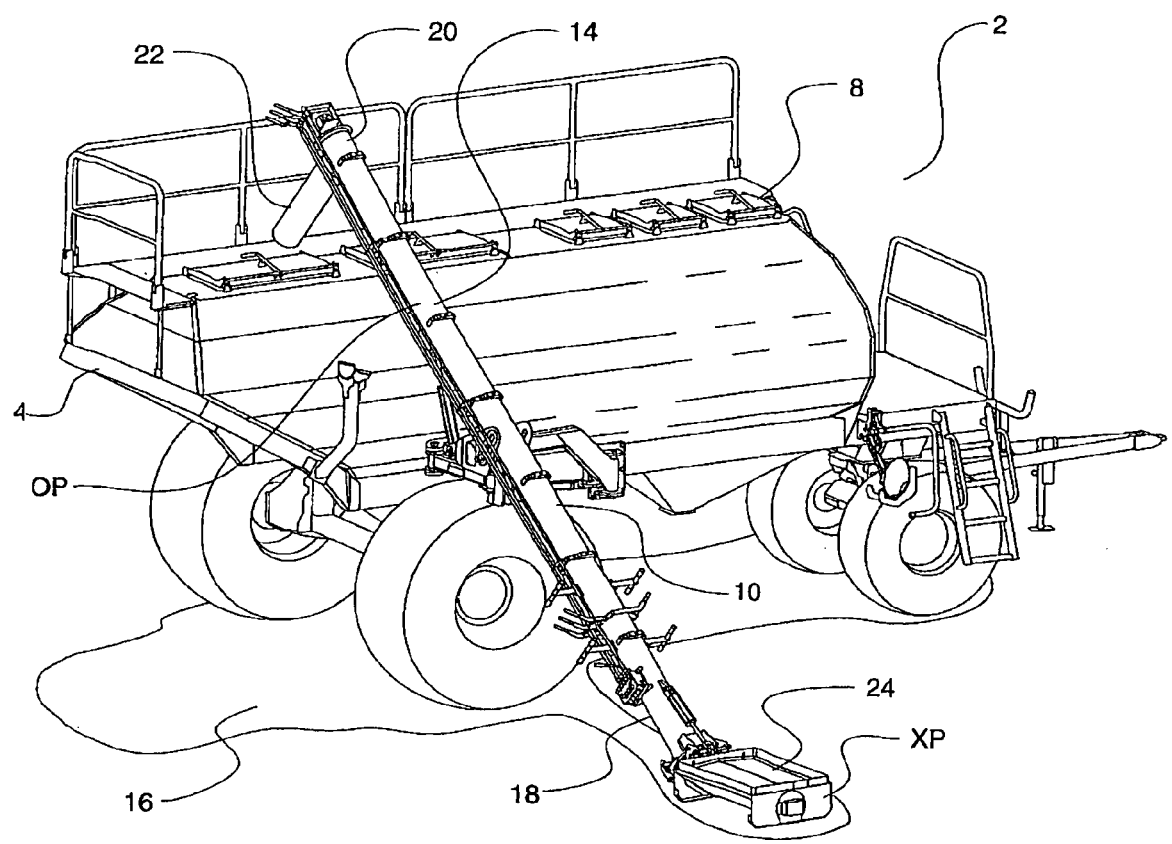
FIG. 2 is a perspective view of an embodiment of the invention with the conveyor in the operating position, and the hopper in the extended position.
Figure 3:
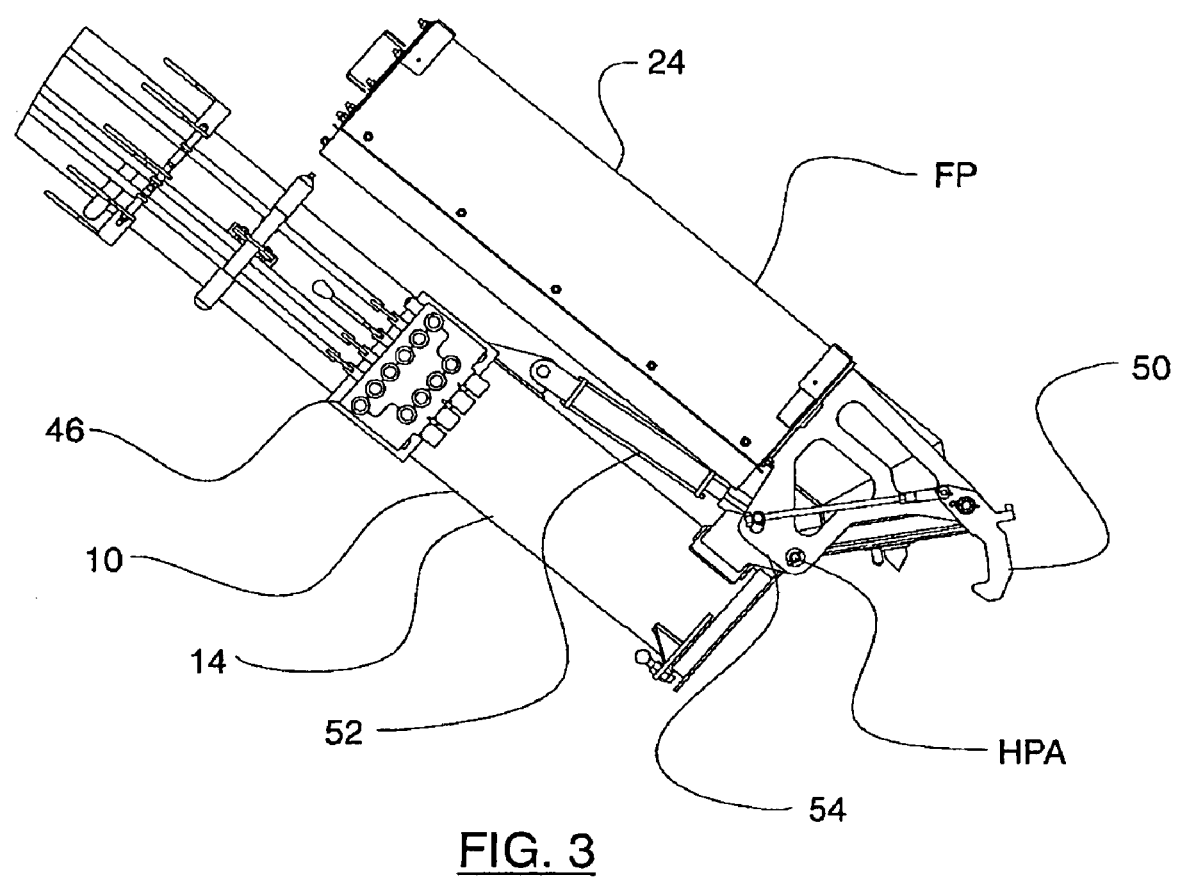
FIG. 3 is a side view of the embodiment of FIG. 1 with the hopper in the folded position.
Figure 4:
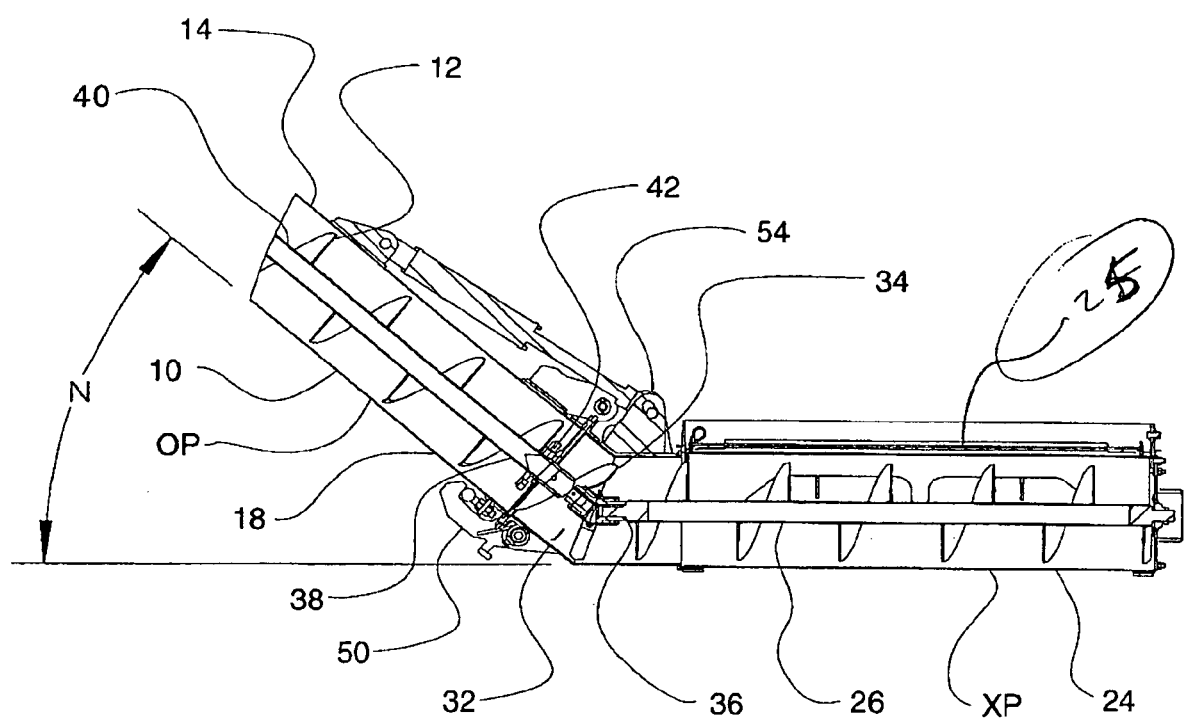
FIG. 4 is a side view of the embodiment of FIG. 1 with the hopper in the extended position.
Figure 10:
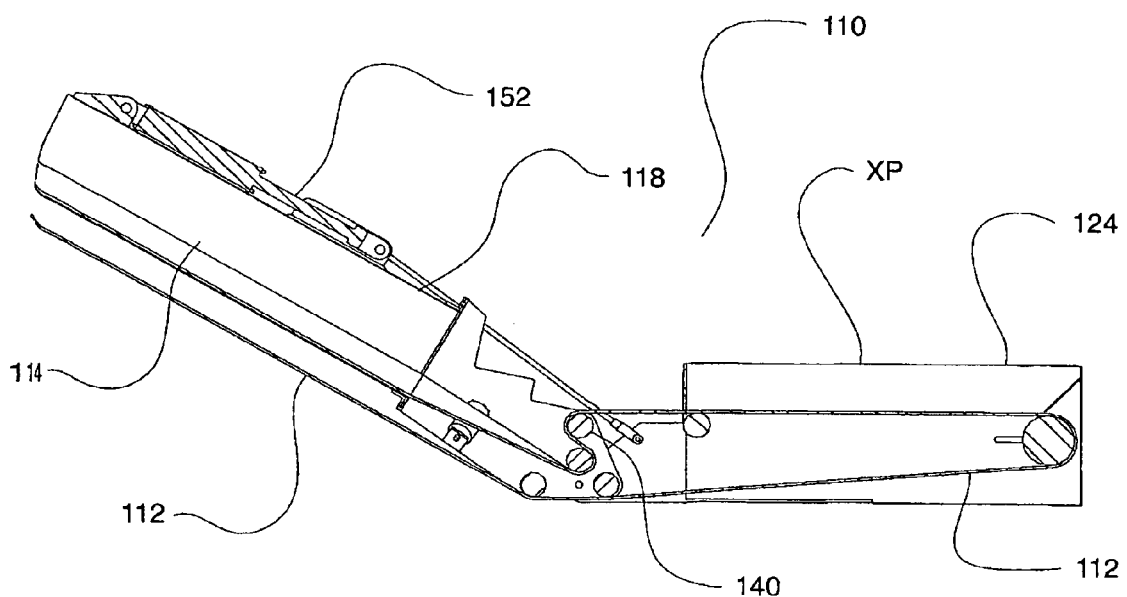
FIG. 10 is a schematic side view of a belt conveyor of the invention in the extended position.
Figure 11:
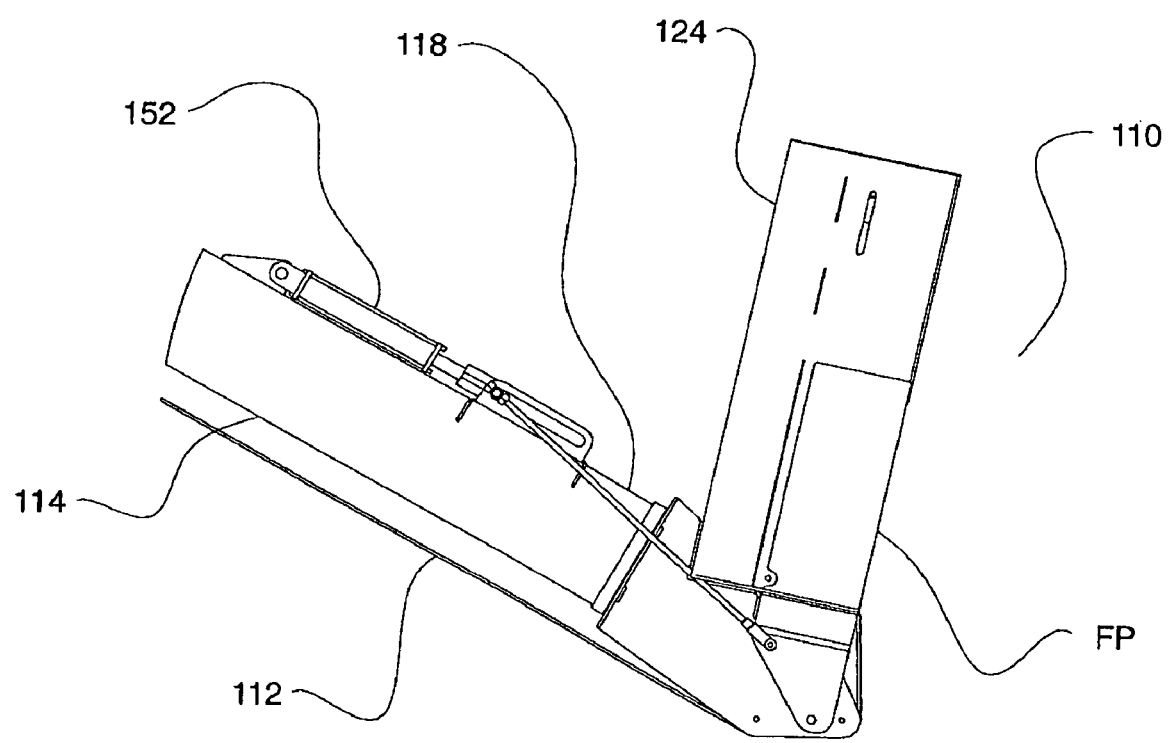
FIG. 11 is a schematic side view of the belt conveyor of FIG. 10 in the folded position.

In the embodiment of FIGS. 1-9 the conveyor 10 comprises an auger 12 inside a conveyor tube 14 as illustrated in FIG. 4. As described below, FIGS. 10 and 11 schematically illustrate an alternate embodiment in use with a belt conveyor.

The conveyor 10 is mounted to the cart 4 such that the conveyor 10 can be moved from a transport position TP wherein the conveyor is raised off the ground 16 for transport as illustrated in FIG. 1, to an operating position OP as illustrated in FIG. 2 for transferring agricultural materials from a transport vehicle to one of the tanks 6. In the operating position OP the lower end 18 of the conveyor tube 14 is substantially on the ground 16 and an upper discharge end 20 is oriented to direct material discharged into one of the fill hatches 8, typically through a chute 22 or the like.

In order to facilitate transferring agricultural materials from hopper-bottom trailers and like transport vehicles, the invention provides a hopper 24 pivotally attached to the lower end 18 of the conveyor tube 14. A hopper conveyor section comprises an auger extension 26 rotatably mounted along the bottom of the hopper 24, as illustrated in FIG. 4.

In the extended position XP of FIGS. 2 and 4 the hopper 24 is oriented at an angle to the conveyor tube 14 such that the hopper 24 extends along the ground when the conveyor 10 is in the operating position OP, as illustrated in FIGS. 2 and 4. The angle N in the illustrated embodiment between the auger extension 26 and the conveyor tube 14 is about 40°, and can be modified to suit the particular configuration.

In the extended position XP the hopper 24 adds significantly to the length of the conveyor 10, such that it could interfere with access to ladders and the like on the cart 4, or contact the tool bar and cause damage. To avoid these problems, the hopper 24 can pivot from the extended position XP to a folded position FP wherein the hopper 24 is above the conveyor tube 14 as illustrated in FIGS. 1 and 3.

In the illustrated embodiment the hopper 24 is folded over on top of the conveyor tube 14 so as to be oriented above and substantially aligned with the conveyor tube 14, making for the most compact folded position that is least likely to interfere with operations of the air seeder. It is contemplated that the hopper 24 could be folded beside the conveyor tube 14 as well, or in some other manner that reduced the interference caused by the hopper 24 in the conditions encountered in a particular application.

In the illustrated embodiment, a tube transition section 32 extends from a rear end of the hopper 24 at an angle to the auger extension 26 such that the tube transition section 32 is aligned with the tube 14 of the conveyor 10 when the hopper 24 is in the extended position XP. An auger section 34 inside the tube transition section 32 is connected at one end to an inner end 36 of the auger extension 26 by a universal joint, flexible shaft, gear box, or the like. The opposite end of the auger section 34 is adapted to engage the lower end 38 of the auger 12 of the conveyor 10. In the illustrated embodiment the shaft 40 of the auger 12 is hollow, and the end of the auger section 34 extends somewhat into the shaft 40 to align the auger section 34 with the auger 12, and a pin 42 on the auger section 34 engages the end of the flighting or a like protrusion on the lower end 38 of the auger 12 so that rotation of the auger 12 causes rotation of the auger section 34 and the auger extension 26. Thus the hopper conveyor section conveys material entering the hopper 24 into the lower end 18 of the conveyor tube 14 for conveyance up the conveyor tube 14.

To prevent accidental separation of the hopper 24 and conveyor tube 14 during operation, a lock 50 is operative to lock the hopper 24 and conveyor tube 14 together when the hopper 24 is in the extended position XP.

Figure 7:
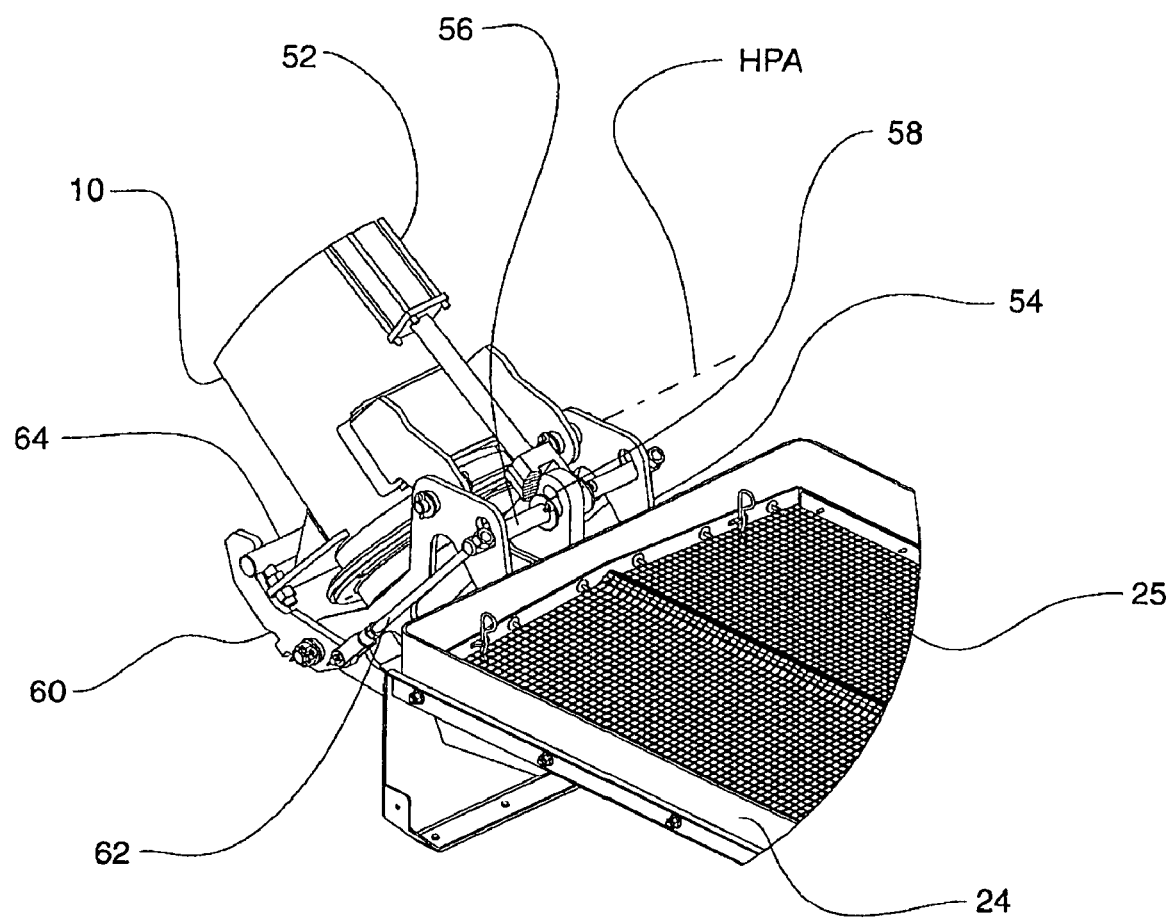
FIG. 7 is a perspective view of the hopper hydraulic cylinder attached to the hopper pin.

The illustrated apparatus 2 is designed for use with a relatively large conveyor 10, such as one having, for example a tube 14 with a diameter of ten inches. The corresponding hopper 24 is about 42 inches long. The hopper 2 is covered by a sieve screen 25 as illustrated in FIG. 7 that has a mesh size small enough to prevent lumps and foreign objects that could plug tubes from entering the agricultural commodity cart. The sieve screen 25 also inhibits the flow of agricultural products through the sieve screen 25 and into the hopper 24. When increasing the size of the auger conveyor to ten inches the area of the sieve screen 25 must be made sufficiently large to allow the agricultural products to flow into the intake at the required increased rate to allow the conveyor to operate at full capacity. The length of the hopper 24 is of such a size to provide sufficient screen area, as well as to readily extend under hopper-bottom trailers and the like. The hopper 24 thus becomes too large and too heavy to conveniently pivot manually.

The illustrated embodiment of FIGS. 1-9 therefore provides an extendable hopper actuator comprising a hopper hydraulic cylinder 52 attached at one end to the conveyor tube 14 and attached at an opposite end to the hopper 24. A hopper control, typically a conventional hydraulic valve 46, is operative to selectively extend the hopper hydraulic cylinder 52 to move the hopper 24 to the extended position XP and retract the hopper hydraulic cylinder 52 to move the hopper 24 to the folded position FP.

The hopper 24 is pivotally attached to the lower end 18 of the conveyor tube 14 about a hopper pivot axis HPA located above the conveyor tube 14 and oriented substantially horizontal and perpendicular to the conveyor tube 14. The hopper hydraulic cylinder 52 is attached to the hopper 24 at a location above the hopper pivot axis HPA. A hopper bracket 54 is attached to the hopper 24 and the hopper hydraulic cylinder 52 is attached to the hopper 24 by attachment to a hopper pin 56 extending through a hopper slot 58 defined by the hopper bracket 54.

Figure 5:
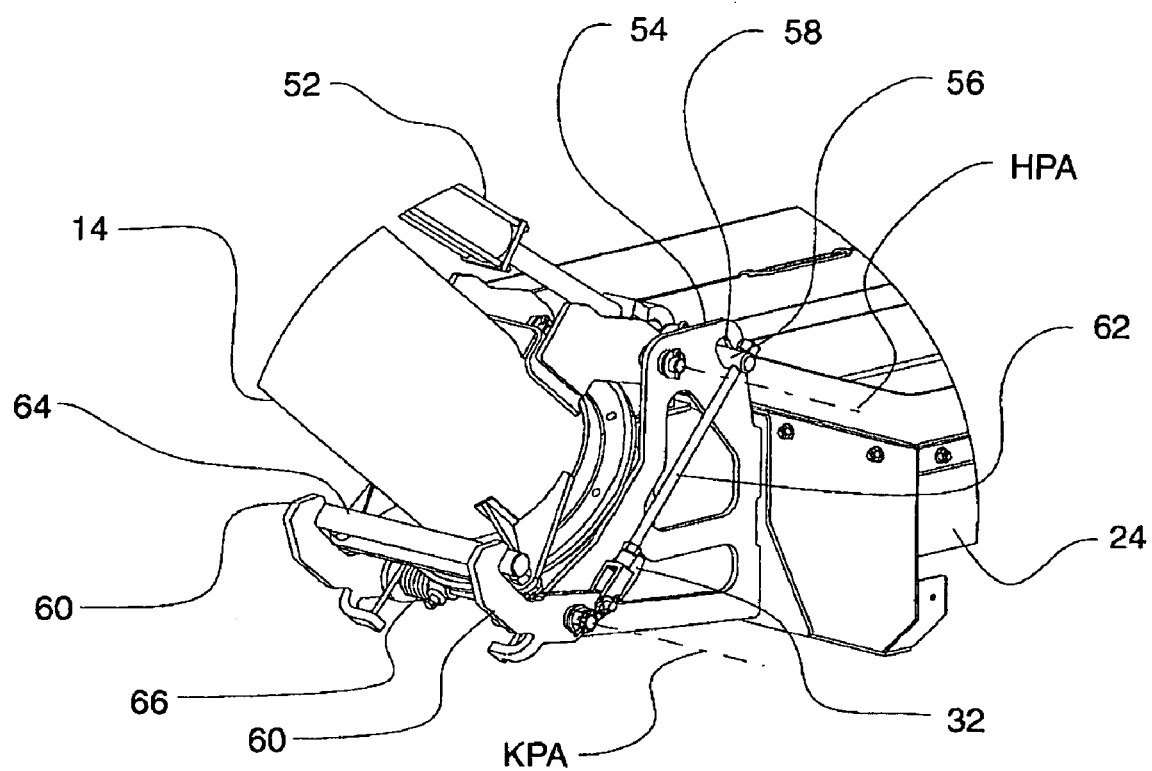
FIG. 5 is a perspective view of the hooks and crossbar of the lock engaged to lock the conveyor tube and hopper together.
Figure 6:
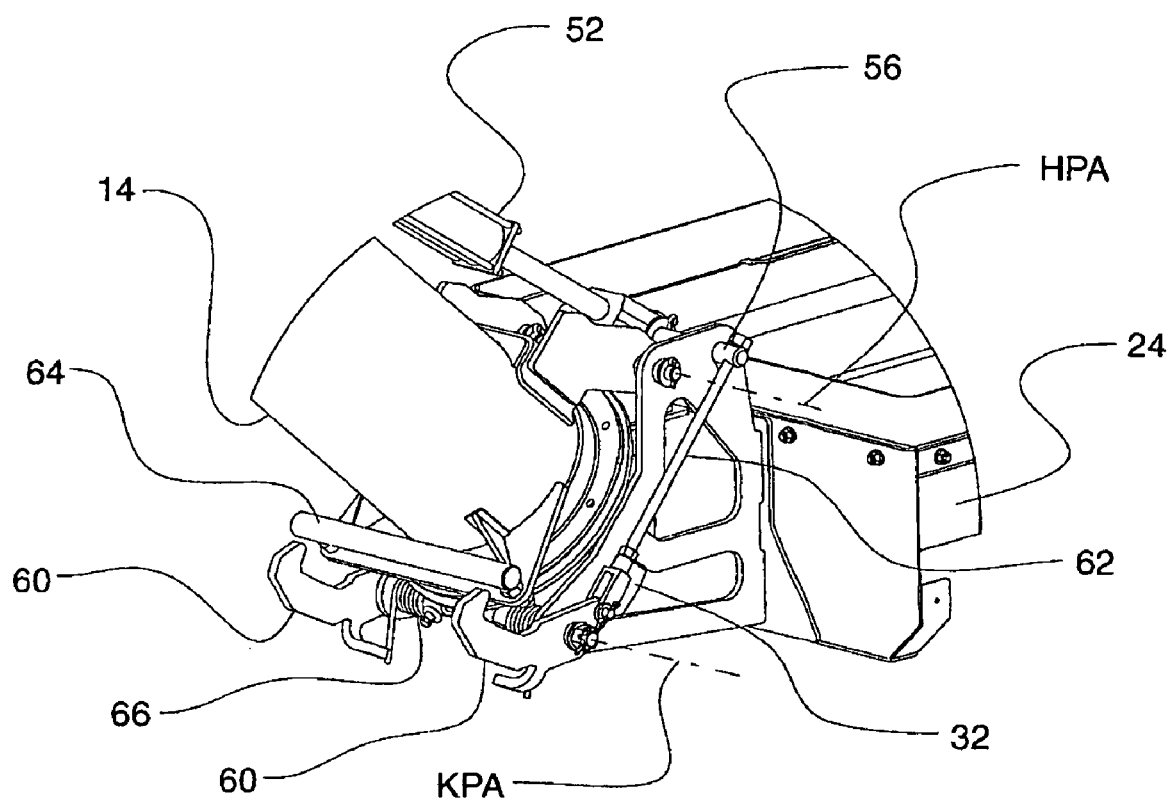
FIG. 6 is a perspective view of the hooks and crossbar of the lock disengaged to allow the hopper to be folded.

FIGS. 5-7 illustrate a lock 50. In the illustrated embodiment the lock 50 is configured to lock the hopper 24 and conveyor tube 14 together when the hopper hydraulic cylinder 52 is extended to a maximum position and to unlock the hopper 24 and conveyor tube 14 when the hopper hydraulic cylinder 52 is retracted from the maximum position.

The illustrated lock 50 comprises a pair of hooks 60 pivotally attached to the hopper 24 about a hook pivot axis KPA. As illustrated the pair of hooks 60 are conveniently pivotally attached to the hopper 24 by pivotal attachment to lower portions of the hopper brackets 54 next to the tube transition section 32. The pair of hooks 60 is linked to the hopper hydraulic cylinder 52 by a release rod 62 on each side of the conveyor tube 14 linking the hopper pin 56 and the hooks 60. Thus movement of the hopper hydraulic cylinder 52 moves the hopper pin 56 which moves the release rods 62 and thus the hooks 60.

The lock 50 further comprises a crossbar 64 fixed to the conveyor tube 14 and configured such that the hooks 60 engage the crossbar 64 to lock the hopper 24 and conveyor tube 14 together. A bias element, illustrated as springs 66, urges the hooks to pivot upward to engage the crossbar 64. When the hopper hydraulic cylinder 52 is extended to the maximum position as illustrated in FIG. 5 the hopper pin 56 moves to a first end of the hopper slot 58, and the release rod 62 moves down somewhat allowing the hook to move into engagement with the crossbar in response to a bias force exerted by the bias element. This mechanism better assures engagement of the hooks 60 on the crossbar 64, since it is not the force of the hopper hydraulic cylinder 52 that holds the hooks in engagement with the crossbar 64, but the bias force exerted by the springs 66. An accidental loss of hydraulic pressure, or creeping of the hopper hydraulic cylinder 52 will thus not cause the lock 50 to disengage.

When the hopper hydraulic cylinder 52 is retracted from the maximum position the hopper pin 56 moves along the hopper slot 58 from the first end toward the opposite second end, drawing the release rods 62 up as the hopper pin 56 moves along the hopper slot 58, and thereby moving the hooks 60 against the bias force exerted by the springs 66 and out of engagement with the crossbar 64. When the hopper pin 56 reaches the second end of the hopper slot 58, in the position illustrated in FIG. 6, the hooks 60 are disengaged from the crossbar 64, and the hopper pin 56 then bears against the second end of the hopper slot 58 to raise and fold the hopper 24.

Figure 8:
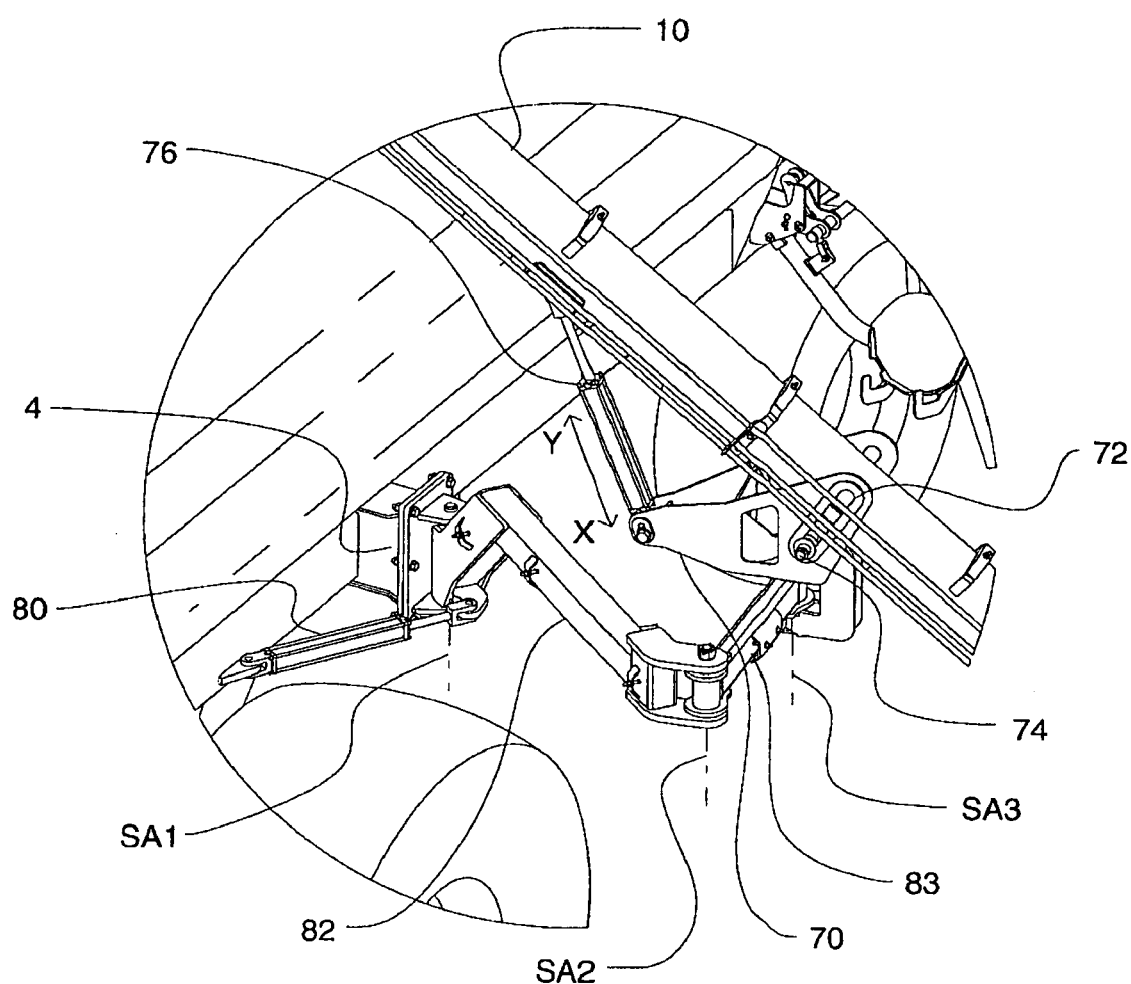
FIG. 8 is a perspective view of the attachment of the conveyor to the cart, with the intake end of the conveyor near the ground.
Figure 9:
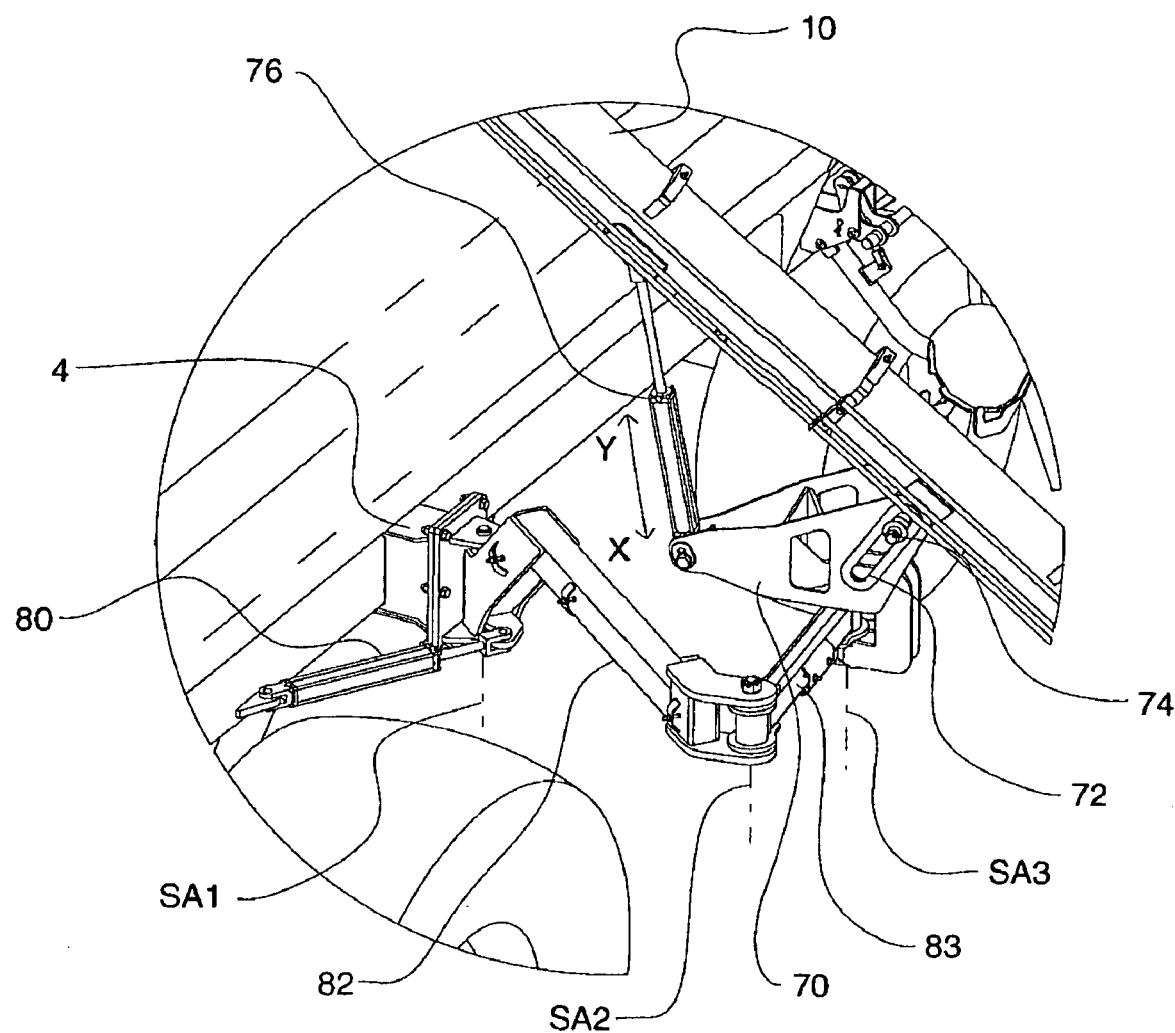
FIG. 9 is a perspective view of the attachment of the conveyor to the cart, with the lower end of the conveyor tube on the ground, and the discharge end of the conveyor in position to discharge into a fill hatch.

FIGS. 8 and 9 illustrate an attachment of the conveyor 10 to the cart 4 that is particularly advantageous for maneuvering larger ten inch diameter auger conveyors. A mounting bracket 70 is attached to the cart 4 and defines a mounting slot 72. The conveyor 10 is mounted to the cart by a conveyor pin 74 through the mounting slot 72. A conveyor hydraulic cylinder 76 is pivotally attached to the cart 4 at one end and to the conveyor tube 14 at an opposite end. In the illustrated embodiment the conveyor hydraulic cylinder 76 is pivotally attached to the cart 4 by pivotal attachment to the mounting bracket 70, which in turn is attached to the cart 4 by pivotal attachment to the second swing bracket 83.

The conveyor hydraulic cylinder 76 and the mounting slot 72 are oriented such that moving the conveyor hydraulic cylinder 76 in a first direction X raises the lower end 18 of the conveyor tube 14 to the transport position TP with the conveyor pin 74 bearing against one end of the mounting slot 72. Moving the conveyor hydraulic cylinder 76 in an opposite second direction Y first lowers the lower end 18 of the conveyor tube 14 to rest on the ground in the operating position, and then further movement of the conveyor hydraulic cylinder 76 in the second direction Y raises the discharge end of the conveyor tube 14 and causes the conveyor pin 74 to move along the mounting slot 72, as illustrated in FIG. 9. The mounting slot 72 allows the conveyor tube 14 to be raised and lowered without risk of exerting a bending force on the conveyor tube 14 that could be caused by the lower end 18 bearing against the ground and resisting movement of the conveyor hydraulic cylinder 76, possibly thereby bending the conveyor tube 14.

To facilitate handling of a large conveyor, the illustrated embodiment further comprises a swing hydraulic cylinder 80 attached between the cart 4 and the conveyor tube 14 and operative to move the conveyor tube 14 laterally about a substantially vertical swing axis.

In the illustrated embodiment, a first swing bracket 82 is pivotally attached to the cart 4 about a substantially vertical first swing axis SA1, and a second swing bracket 83 is pivotally attached to the first swing bracket 82 about a substantially vertical second swing axis SA2. The mounting bracket 70 is pivotally attached to the second swing bracket 83 about a substantially vertical third swing axis SA3. The conveyor tube 14 is attached to the mounting bracket 70 as described above. The swing hydraulic cylinder 80 is attached to the cart 4 at one end and to the first swing bracket 82 at the opposite end. Conventional hydraulic valves 46, as illustrated in FIG. 3, are conveniently located to control the conveyor hydraulic cylinder 76, the swing hydraulic cylinder 80, and the hopper hydraulic cylinder 52 so that the operator can maneuver the conveyor 10 between the transport position and operating positions that will allow the conveyor 10 to discharge agricultural materials into any of the fill hatches 8.

FIGS. 10 and 11 schematically illustrate an embodiment in use with a belt conveyor 110. The belt conveyor 110 comprises a belt 112 inside the conveyor tube 114 for conveying material from the lower end 118 through the conveyor tube 114. The belt 112 extends through the conveyor tube 114 and along the bottom of the hopper 124, passing around a configuration of rollers 140 configured such that the hopper 124 can pivot up from the extended position XP illustrated in FIG. 10 to the folded position FP illustrated in FIG. 11.

Thus the belt 112 extends through the hopper conveyor section and conveys material entering the hopper 124 into the lower end of the conveyor tube 114 for conveyance up the conveyor tube 114.

The embodiment of FIGS. 10 and 11 also shows the use of an electric screw type extendable hopper actuator 152 instead of a hydraulic cylinder to fold the hopper 124. Such an actuator 152 is not susceptible to creeping like a hydraulic cylinder, and so when extended could also serve as the lock to maintain the hopper 124 and conveyor tube 114 in position with the hopper 124 in the extended position. Other mechanisms could also be used that would serve to extend the hopper 24 and lock it in the extended position without risk of the hopper 24 creeping or moving out of position.

In embodiments for use with a smaller conveyor, it is contemplated that the hopper could be folded manually, and a conventional lock mechanism used to releasably lock the hopper and conveyor tube together for operation in the extended position of the hopper.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An agricultural commodity cart loading conveyor apparatus comprising:

an agricultural commodity cart comprising at least one tank having a fill hatch located at a top portion of the cart;

a conveyor comprising a conveyor tube movably mounted to the cart about a substantially vertical swing axis such that the conveyor can be moved from a transport position wherein a lower end of the conveyor tube is raised off the ground and the conveyor tube is substantially aligned with the cart and beside the cart, to an operating position wherein a lower end of the conveyor tube is substantially on the ground and the conveyor tube is inclined upward such that an upper discharge end of the conveyor tube is oriented to direct material discharged there-from into the fill hatch;

a hopper pivotally attached to the lower end of the conveyor tube about a hopper pivot axis located above the conveyor tube and oriented substantially horizontally and perpendicular to the conveyor tube;

a hopper conveyor section mounted along a bottom of the hopper;

wherein the hopper can pivot about the hopper pivot axis from an extended position to a folded position, and wherein in the extended position the hopper is oriented at an angle to the conveyor tube such that the hopper extends along the ground when the conveyor is in the operating position, and in the extended position the hopper is connected to the lower end of the conveyor tube such that the hopper conveyor section conveys material entering the hopper into the lower end of the conveyor tube for conveyance up the conveyor tube, and wherein in the folded position the hopper is above a lower portion of the conveyor tube;

an extendable hopper actuator attached at one end to the conveyor tube and attached at an opposite end to the hopper;

a hopper control operative to selectively extend the hopper actuator to move the hopper to the extended position and retract the hopper actuator to move the hopper to the folded position; and a lock operative to lock the hopper and conveyor tube together when the hopper is in the extended position.

2. The apparatus of claim 1 wherein the hopper actuator comprises a hopper hydraulic cylinder and wherein the lock comprises a hook pivotally attached to the hopper about a hook pivot axis and linked to the hopper hydraulic cylinder, and a crossbar fixed to the conveyor tube and configured such that the hook engages the crossbar to lock the hopper and conveyor tube together when the hopper hydraulic cylinder is extended to a maximum position and such that the hook disengages the crossbar to unlock the hopper and conveyor when the hopper hydraulic cylinder is retracted from the maximum position.

3. The apparatus of claim 2 further comprising a bias element urging the hook to pivot in a direction to engage the crossbar, and wherein when the hopper hydraulic cylinder is extended to the maximum position the hook is allowed to move into engagement with the crossbar in response to a bias force exerted by the bias element, and wherein when the hopper hydraulic cylinder is retracted from the maximum position the hook is moved against the bias force to disengage the crossbar.

4. The apparatus of claim 3 wherein the hopper hydraulic cylinder is attached to the hopper at a location above the hopper pivot axis.

5. The apparatus of claim 4 further comprising a hopper bracket attached to the hopper and wherein the hopper hydraulic cylinder is attached to the hopper by attachment to a hopper pin extending through a hopper slot defined by the hopper bracket; and further comprising a release rod linking the hopper pin and the hook.

6. The apparatus of claim 5 wherein the hopper pin is located substantially at a first end of the hopper slot when the hopper hydraulic cylinder is extended to the maximum position, and wherein the hopper pin moves along the hopper slot when the hopper hydraulic cylinder is retracted from the maximum position, thereby moving the hook out of engagement with the crossbar, and wherein the hopper pin bears against a second end of the hopper slot to fold the hopper.

7. An agricultural commodity cart loading conveyor apparatus comprising:
- an agricultural commodity cart comprising at least one tank having a fill hatch located at a top portion of the cart;
- a conveyor comprising a conveyor tube and mounted to the cart such that the conveyor can be moved from a transport position wherein a lower end of the conveyor tube is raised off the ground, to an operating position wherein a lower end of the conveyor tube is substantially on the ground and the conveyor tube is inclined upward such that an upper discharge end of the conveyor tube is oriented to direct material discharged there-from into a fill hatch;
- a hopper pivotally attached to the lower end of the conveyor tube;
- a hopper conveyor section mounted along a bottom of the hopper;
- wherein the hopper can pivot from an extended position to a folded position, and wherein in the extended position the hopper is oriented at an angle to the conveyor tube such that the hopper extends along the ground when the conveyor is in the operating position, and in the extended position the hopper is connected to the lower end of the conveyor tube such that the hopper conveyor section conveys material entering the hopper into the lower end of the conveyor tube for conveyance up the conveyor tube;
- a lock operative to lock the hopper and conveyor tube together when the hopper is in the extended position;
- a mounting bracket attached to the cart and defining a mounting slot, and wherein the conveyor is mounted to the cart by a conveyor pin through the mounting slot; and
- a conveyor hydraulic cylinder pivotally attached to the cart at one end and to the conveyor tube at an opposite end; and
- wherein the conveyor hydraulic cylinder and the mounting slot are oriented such that moving the conveyor hydraulic cylinder in a first direction raises the lower end of the conveyor tube to the transport position, and such that moving the conveyor hydraulic cylinder in an opposite second direction lowers the lower end of the conveyor tube to rest on the ground in the operating position, and such that further movement of the conveyor hydraulic cylinder in the second direction raises the discharge end of the conveyor and causes the conveyor pin to move along the mounting slot.

8. The apparatus of claim 7 wherein the conveyor hydraulic cylinder is pivotally attached to the cart by pivotal attachment to the mounting bracket.

9. The apparatus of claim 7 further comprising a swing hydraulic cylinder attached between the cart and the conveyor and operative to move the conveyor laterally about a substantially vertical swing axis.

10. The apparatus of claim 9 further comprising a first swing bracket pivotally attached to the cart about a substantially vertical first swing axis, a second swing bracket pivotally attached to the first swing bracket about a substantially vertical second swing axis, and the mounting bracket is pivotally attached to the second swing bracket about a substantially vertical third swing axis, and the swing hydraulic cylinder is attached to the cart at one end and to the first swing bracket at the opposite end.

* * * * *